Sept. 26, 1967 J. E. WILCOX 3,344,353

ERROR-FREE DATA TRANSMISSION SYSTEM

Filed Dec. 24, 1963 3 Sheets-Sheet 1

PROCESSOR 44 AND STORAGE UNIT 46

INVENTOR.
JACK E. WILCOX

BY D B Pressman

ATTORNEY

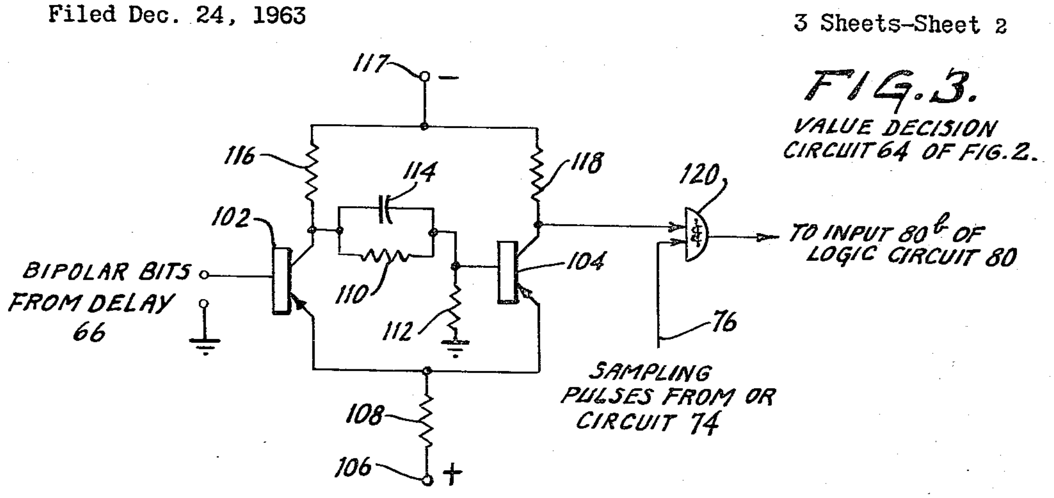

FIG. 3. VALUE DECISION CIRCUIT 64 OF FIG. 2.

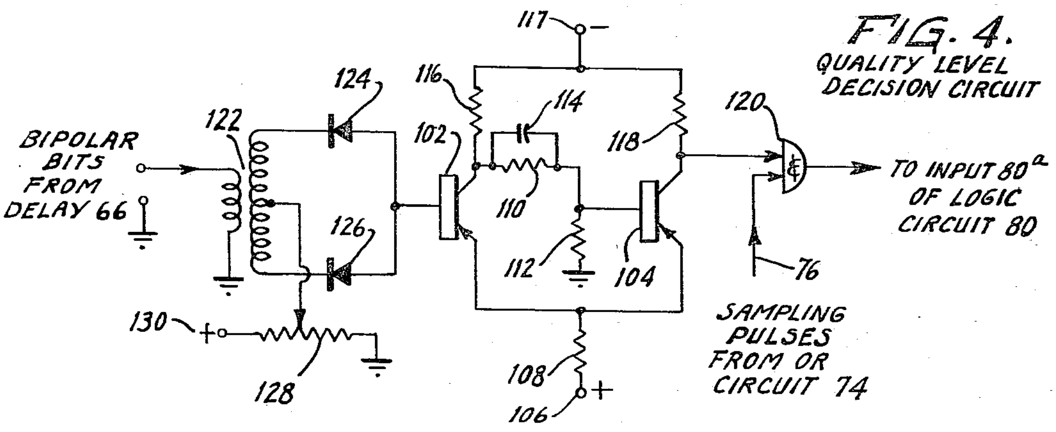

FIG. 4. QUALITY LEVEL DECISION CIRCUIT

| RECEIVED VALUE AND LEVEL (INPUTS 80a AND 80b) ↓ / STORED VALUE AND LEVEL (INPUTS 80c AND 80d) → | M / HI | M / LO | S / LO | S / HI |
|---|---|---|---|---|
| M / HI | M / HI | M / HI | M / LO | RANDOM M OR S / LO |
| M / LO | M / HI | M / LO | RANDOM M OR S / LO | S / LO |
| S / LO | M / LO | RANDOM M OR S / LO | S / LO | S / HI |
| S / HI | RANDOM M OR S / LO | S / LO | S / HI | S / HI |

RESULTANT DECISION (OUTPUTS 80e, 80f)

FIG. 6. TRUTH TABLE FOR LOGIC CIRCUIT 80 OF FIG. 2. AND FIG. 5.

INVENTOR.
JACK E WILCOX
BY D R Bressman
ATTORNEY

ERROR-FREE DATA TRANSMISSION SYSTEM

Filed Dec. 24, 1963

LOGIC CIRCUIT 80 OF FIG. 2.

United States Patent Office 3,344,353

Patented Sept. 26, 1967

3,344,353

ERROR FREE DATA TRANSMISSION SYSTEM

Jack E. Wilcox, Garrett, Ind., assignor to Philco-Ford Corporation, a corporation of Delaware Filed Dec. 24, 1963, Ser. No. 333,097

11 Claims. (Cl. 325—41)

ABSTRACT OF THE DISCLOSURE

System for transmitting a data signal without error from a control to a remote station by repeatedly transmitting the data signal to the remote staion and synthesizing at the remote station, on a bit-by-bit basis, a correct data signal by comparing both the value and quality level of each bit of each received signal with the value ad quality level of each corresponding bit of the last-synthesized signal.

The present invention relates to information transmission systems and more particularly to error-free data transmission systems.

In the past error-free transmission of data signals has been accomplished by the process of repeatedly transmitting the same data signal until the entire signal has been received correctly by the remote station. Error-free reception of the data signal is recognized by retransmitting to the initiating station the data signal as received at the remote station and then comparing the retransmitted signal with the one originally transmitted. When it has been established that the data signal has been received correctly, a second, readily identifiable, signal may be sent to the remote station to indicate correct reception of the desired data. Systems of this type have been employed for communication with satellites and the like where the communication channel from ground to satellite generally has a relatively poor signal-to-noise ratio (due principally to the relatively small antenna which can be mounted on a satellite), while the channel from satellite to ground has a relatively high signal to noise ratio which permits substantially error-free transmisison of the returned signal.

The main disadvantage of systems of the prior art is that, if the signal-to-noise ratio in the channel from the control station to the remote receiver is low, say of the order of unity or less, the data signal must be sent many times before it is received correctly. Even though a portion of the data signal may have been received correctly, such portion cannot be salvaged; the signal must still be repeated until it is received correctly in its entirety. In addition to severely delaying the reception of a correct signal, this process also severely limits the total amount of data that may be transmitted to the remote station in any given time period.

OBJECTS

Accordingly several objects of this invention are:

(1) to provide an improved information transmission system which materially reduces the time required to transmit error-free data under adverse signal to noise conditions;

(2) to provide a reliable data transmission system which will function well in the presence of noise;

(3) to provide a data transmission system of the repetitive type wherein an entire transmitted signal does not have to be received correctly in order to effect error-free transmisison of data signals; and (4) to provide a data transmision system which is capable of deriving a correct data signal from a plurality of imperfect data signals.

Other objects and advantages of the invention will become apparent from a consideration of the ensuing description thereof.

SUMMARY

According to the invention means are provided at a remote station for receiving, processing, and storing information relating to each bit of a data signal received from a control station. As each repeated data signal is received from the control station, the identity and quality of each individual bit thereof are compared with the identity and quality of each corresponding bit of a previously stored data signal so that a new stored data signal can be synthesized on a bit-by-bit basis using the comparison to give best estimate as to the quality and identity of each bit. These synthesized data signals are also retransmitted to the control station for evaluation until it has been determined that the correct signal has been received.

DRAWINGS

FIG. 3 is a schematic of the command decision circuit of FIG. 2;

FIG. 4 is a schematic diagram of the quality level decision circuit of FIG. 2;

FIG. 6 is a truth table for the logic circuit of FIGS. 2 and 5.

FIG. 1.—DESCRIPTION

Figure 1:
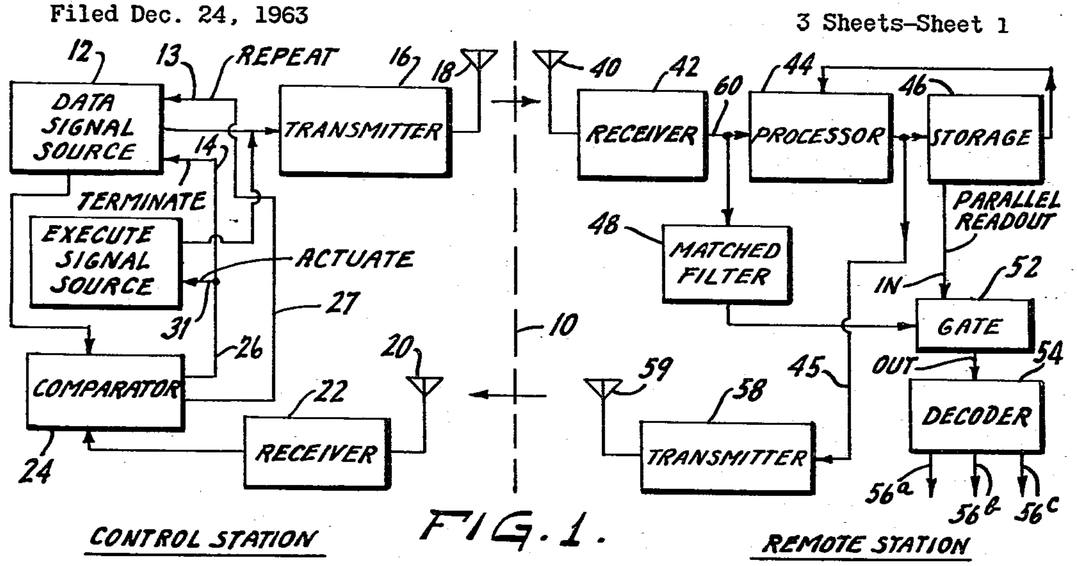
FIG. 1 is a block diagram of a satellite command system in accordance with the present invention.

In FIG. 1 the equipment at the left of broken line 10 represents the equipment located at the control station. The equipment at the right of line 10 represents the equipment at the remote station, e.g., a satellite.

*Control station*

The data signal source 12 at the control station comprises means for generating repetitive time sequential binary coded data signals for the remote station. Each time REPEAT input 13 of source 12 is actuated the same data signal will be transmitted by source 12. Source 12 is also arranged to repeat the same data signal automatically if its repeat input is not actuated for a predetermined interval after the last data signal was transmitted. Repetitions of the data signal will be terminated when the TERMINATE input 14 of source 12 is energized. In a typical system each data signal provided by source 12 may comprise, say, 20 to 40 binary bits. One type of data signal generated by source 12 may, for instance, direct a satellite to actuate positional control equipment for a preselected time duration. Another data signal may direct the satellite to transmit to the control station data stored in tape recorders in the satellite. The means for generating and selecting the appropriate data signals are well known in the art and will not be described further.

The binary coded data signals from source 12 are supplied to a transmitter 16. Transmitter 16 modulates a carrier signal according to whether each bit in the data signal is a binary ONE or ZERO. The output of transmitter 16 is connected to the transmitting antenna 18.

To avoid confusion with certain other signals generated at the control station the two values of each bit of the data signal will be identified as MARK and SPACE, respectively, rather than ONE and ZERO. Transmitters of this type are well known in the frequency-shift radio telegraphy art. In this art a signal of one frequency is employed to represent a MARK and a different frequency signal is employed to represent a SPACE. Any other type of modulation may be used as desired, however.

Antenna 20 and receiver 22 are provided for receiving the signals retransmitted by the remote station. Receiver 22 and transmitter 16 preferably operate on different channels or in different frequency bands to minimize the cross-talk from transmitter 16 to receiver 22.

The received signals are supplied to comparator 24 which also receives a signal representative of the data signal transmitted by source 12. The output connection 26 of comparator 24 will be actuated if the two signals supplied thereto are alike and output 27 will be actuated if the two signals supplied thereto are not alike. Comparator 24 of course includes time control means to compensate for the transmission and processing delays affecting the signal retransmitted by the remote station. Comparator circuits of this type are also well known in the digital computer art and so require no detailed description. Output 27 is connected to the REPEAT input 13 of source 12 and output 26 is connected to the TERMINATE input 14 of source 12 also and to the ACTUATE input 31 of execute signal source 30.

When its actuate input is energized, source 30 provides an execute signal which is encoded only to the extent necessary to distinguish it from noise and stray signals which may be picked up at the remote station. For example the execute signal may comprise a group of 3 to 6 pulses of preselected width and spacing. Source 30 will repeat the execute signal until it has been determined that it has been received at the remote station.

*Remote station*

The remote station comprises a receiving antenna 40 which receives the signal transmitted by antenna 18 at the control station and supplies it to receiver 42. Receiver 42 may be a conventional superheterodyne receiver. The output of receiver 42 is supplied on line 60 to signal processor 44 which also receives signals from storage unit 46. Processor 44 is shown in greater detail in FIGS. 2–4. Storage circuit 46 of FIG. 1, also shown in greater detail in FIG. 2, receives input signals from processor 44 and simultaneously supplies output signals to the same processor 44. Storage circuit 46 may comprise serial type shift registers.

The output of receiver 42 is also supplied to matched filter 48, which is arranged to recognize the execute signal supplied by source 30 at the control station. Filter 48 may comprise pulse decoder circuits of the type shown in Radiation Laboratory Series, volume 3, "Radar Beacons," McGraw-Hill Book Co., Inc., chapter 9, for example. Alternatively, in lieu of a matched filter may be used a correlation device as described in Electronics, May 22, 1959, pp. 58–60. Such devices have the capability of distinguishing signals so immersed in noise that they are indistinguishable when ordinary equipment is used. The output of filter 48 is coupled to gate circuit 52 which controls the flow of signals from storage circuit 46 to decoder 54. Decoder 54 is provided with a plurality of output connections 56$^a$, 56$^b$, 56$^c$, etc. One or more output connections are energized in response to each data signal supplied by way of gate 52. Decoding circuits of this type are described in detail in Digital Computer and Control Engineering, McGraw-Hill Book Company, Inc., 1960, pp. 547–556. Outputs 56$^a$, 56$^b$, 56$^c$, etc., may be connected to the control inputs of satellite equipment such as position controls, recorders, transmitters, etc.

An output of processor 44 is also supplied on lead 45 to transmitter 58 which retransmits said output to the control station via antenna 59.

FIG. 1.—OPERATION

When a data signal is transmitted by the control station, the bits thereof are supplied in sequence to processor 44 by receiver 42. Processor 44 analyzes each bit to determine: (1) its value, i.e., whether it is a MARK or a SPACE, and (2) its quality level, i.e., whether the absolute amplitude of the bit is above or below a predetermined absolute threshold. The value decision is based on the polarity of each bit with respect to some reference level, e.g., zero volts. If the polarity of the bit is, say, positive, processor 44 will supply a binary ONE, indicating a MARK, and if the bit is, say, negative, a binary ZERO, indicating a SPACE will be supplied. The quality level decision circuit in processor 44 will supply a binary ONE, indicating high (HI) quality, i.e., high received quality and hence probability of being correct if the absolute amplitude of the bit is above a predetermined absolute threshold level, and a binary ZERO indicating low (LO) quality if the absolute amplitude of the bit is below the predetermined threshold level.

The value and quality level decisions for each bit in the first-transmitted data signal are fed simultaneously by processor 44 to storage unit 46 where they are stored. The value decisions are also sent to transmitter 58 via line 45 and retransmitted to the control station.

If the first-transmitted data signal is received *correctly* by the remote station, it will retransmit the same to the control station as described, and the latter will transmit an execute signal to the remote station after it has determined that the restransmitted signal was identical to the one originally sent. Matched filter 48 will recognize the execute signal and render gate 52 transmissive, allowing the correct value decisions stored in storage unit 46 to be sent to decoder 54 to effect the prescribed functional operations.

If the control station determines that the remote station had received the data signal *incorrectly*, it will repeat and retransmit the data signal. Processor 44 will now compare the value and quality levels for the bits of the data signal as received the second time with the corresponding stored values and quality levels. Processor 44 will synthesize a new data signal on a bit-by-bit basis, each bit representing the best estimate—based on the stored and received bits and their concomitant quality levels—of what the correct value of the transmitted bit was. Processor 44 will also synthesize and assign a new group of quality levels for respective ones of the synthesized bits. The bits and quality levels are synthesized in accordance with the following rules:

(1) When the corresponding stored and received bits have identical values, a synthesized bit having the same value will be generated and a quality level of HI will be assigned.

(2) When the corresponding stored and received bits have different values and their corresponding quality levels are also different, a synthesized bit having a value the same as the stored or received bit having the HI quality level will be generated, and a synthesized quality level of LO will be assigned.

(3) When the corresponding values of the stored and received bits are different, but their quality levels are the same, there is no basis for making a decision. A random synthesized value of either MARK or SPACE will be generated and a quality level of LO will be assigned.

These rules are shown in tabular form in FIG. 6 where "M" and "S" represent MARK and SPACE, respectively, for a given bit of the data word. HI represents a high quality level, and LO a low quality level. The logic circuit 80 of FIG. 2, which is shown schematically in FIG. 5, implements the truth table of FIG. 6.

The synthesized values and quality levels generated by processor 44 are stored in unit 46 for a subsequent comparison if needed. Simultaneously, the synthesized values are also retransmitted by transmitter 58 to the control station.

If the correct data signal has been synthesized, the control station will recognize it and transmit an execute signal, but if not the data signal will be repeated and the process continued until it is determined that the remote station has synthesized the correct signal.

It should be noted that, unlike the repeat and discard systems of the prior art, the present system is capable of synthesizing a correct data signal from a plurality of incorrectly received data signals. By effectively extracting and storing any correctly received bits from several incorrectly received signals, the system of the present invention has the unique ability to synthesize a complete correct data signal.

It can also be shown, on the basis of probability theory, that the number of trials required to obtain the correct data signal becomes increasingly less for the present system in relation to the prior art repeat and discard system as the signal-to-noise ratio decreases.

One preferred system for performing the decisional and storage operations described above is shown in FIGS. 2–5.

FIG. 2.—DESCRIPTION

Figure 2:
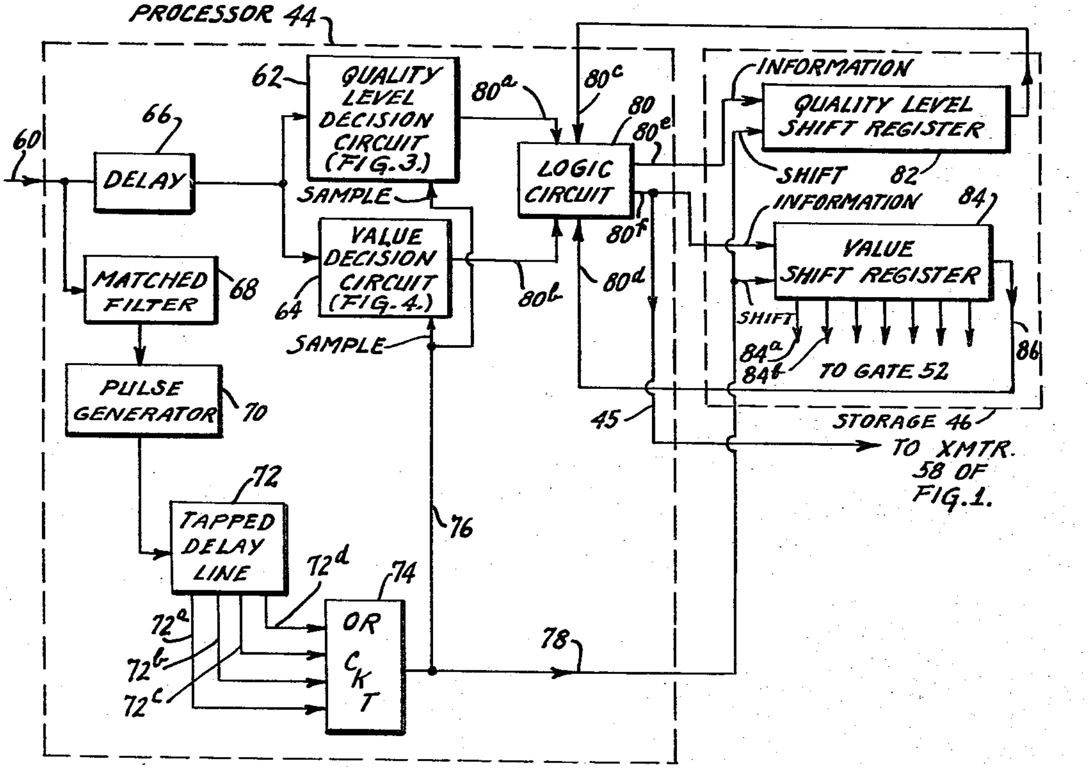
FIG. 2 is a detailed block diagram of the processor and storage circuit of the system of FIG. 1.

FIG. 2 shows systems that may be used for processor 44 and storage unit 46. Processor 44 includes a quality level decision circuit 62 which is shown schematically in FIG. 3, and a value decision circuit 64 which is shown schematically in FIG. 4.

*Value decision circuit 64* determines whether each incoming bit is a MARK or a SPACE by determining whether the bit is respectively greater or lesser than a predetermined level of symmetry, e.g., zero volts. A MARK and SPACE are indicated, respectively, by a binary ONE and ZERO, as discussed. As is well known, a ONE and ZERO may be represented, respectively, by two different positive voltages, two different negative voltages, a positive and a negative voltage, or a positive or negative voltage and zero volts. In the exemplary circuits of the present invention a negative voltage and zero volts are used to indicate ONE (MARK) and ZERO (SPACE), respectively.

*Quality level decision circuit 62* determines the rereceived quality of the incoming bits irrespective of their value. When a bit is received whose absolute amplitude is above a predetermined absolute threshold, circuit 62 will supply a binary ONE, indicating HI, for a high probability of being correct. When the bit is below the predetermined threshold, or even nonexistent, circuit 62 will supply a ZERO, indicating LO, for low probability. Again a negative voltage is used to indicate ONE (HI) and zero volts are used for a binary ZERO (LO).

Before being applied to circuits 62 and 64, however, the received bits from receiver 42 are first sent to delay unit 66. Delay circuit 66 is provided to compensate for the signal delay inherent in circuits 68, 70, 72, and 74 to which the bits are also applied in parallel.

Matched filter 68, pulse generator 70, tapped delay line 72, and OR circuit 74 together constitute starting and synchronizing circuits for the receiver. Matched filter 68 is similar to matched filter 48 of FIG. 1, but is arranged to recognize a start signal which precedes each data signal and which is different from the execute signal. Matched filter 68 is arranged to provide a pulse or other suitable signal upon recognition of the start signal.

Pulse generator 70, connected to the output of matched filter 68, is arranged, upon receipt of an output signal from matched filter 68, to provide a strong pulse sufficient to travel the entire length of tapped delay line 72, to which the pulse is applied.

Delay line 72 has a plurality of taps $72^{a}$, $72^{b}$, $72^{c}$, etc. When pulsed by pulse generator 70 the taps will be sequentially energized in well-known fashion as the pulse travels down the line. The temporal separation of the taps is equal to the period of the bits in the data signal. The taps are connected to leads 76 and 78 via OR circuit 74 which is provided to isolate the taps from each other. Lead 76 is connected in parallel to the SAMPLE inputs of circuits 62 and 64, while lead 78 is connected to the SHIFT inputs of registers 82 and 84.

Figure 5:
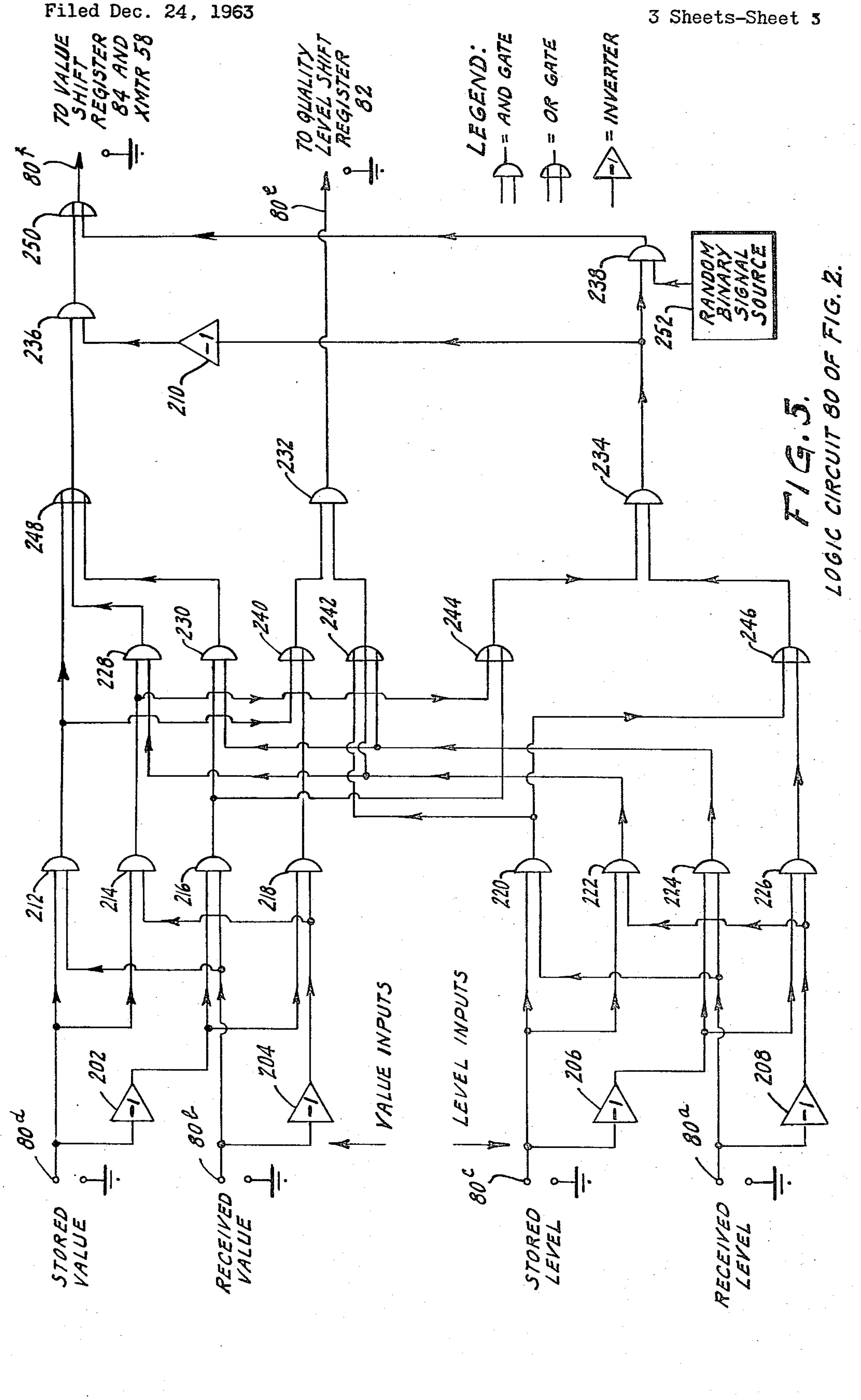
FIG. 5 is a schematic diagram of the logic circuit of the system of FIG. 2.

Logic circuit 80, detailed in FIG. 5, performs the logic tabulated in FIG. 6. Circuit 80 has four inputs: $80^{a}$, the received level input from circuit 62; $80^{b}$, the received value input from circuit 64; $80^{c}$, the stored level input from register 82; and $80^{d}$, the stored value input from register 84. Circuit 80 also has two outputs; $80^{e}$, the synthesized level output to register 82; and $80^{f}$, the synthesized value output to register 84. The inputs and outputs of circuit 80 are each capable of assuming only two voltaic levels, i.e., a binary ONE and ZERO. On level inputs $80^{a}$ and $80^{c}$ and level output $80^{e}$ a ONE and a ZERO indicate HI and LO, respectively, while on value inputs $80^{b}$ and $80^{d}$ and value output $80^{f}$ a ONE and ZERO indicate MARK and SPACE, respectively. The following is a review of the logic of the truth table of FIG. 6 as applied to the designated leads of logic circuit 80.

(1) When the values on inputs $80^{a}$ and $80^{d}$ are the same, i.e., both supply a MARK or both supply a SPACE, output $80^{f}$ will supply the same value as the inputs. Also output $80^{e}$ will indicate a HI quality level if either of inputs $80^{a}$ or $80^{c}$ or both supply a HI input, and if not, output $80^{e}$ will supply a LO quality level.

(2) When the values on input $80^{b}$ and $80^{d}$ are different, i.e., one supplies a MARK and the other a SPACE, and the quality levels on inputs $80^{a}$ and $80^{c}$ are different, i.e., one supplies a LO and the other a HI, then output $80^{f}$ will supply the same value as the input having HI quality, and outputs $80^{e}$ will supply a LO quality level.

(3) When the values on inputs $80^{b}$ and $80^{d}$ are different, but the quality levels on inputs $80^{a}$ and $80^{c}$ are the same, there is no basis for making a decision. In this case a random choice of MARK or SPACE is supplied on output $80^{f}$, and output $80^{e}$ will indicate LO quality.

Output $80^{f}$ is also connected to transmitter 58 of FIG. 1 via lead 45.

In storage unit 46 quality level shift register 82 has two inputs connected respectively to output $80^{e}$ of circuit 80 and line 78. The LO and HI indications on output $80^{e}$ from circuit 80 are fed to the INFORMATION input and the synchronizing pulses on lead 78 are fed to the SHIFT input of register 82. The output of register 82 is connected to input $80^{c}$ of logic circuit 80. When the quality level indicative bits are supplied to the information input concomitantly with shift pulses, the quality bits will be shifted into the stages of register 82 and any information already present in said stages will be shifted out in serial fashion to input $80^{c}$. The number of stages in register 82 should equal the number of bits in the data signal.

Value shift register 84 is identical to register 82 with the exception that register 84 additionally has a provision for parallel readout on lines $84^{a}$, $84^{b}$, etc. Said parallel readout lines are connected to gate 52. Line 86 is a serial readout which is connected to input $80^{d}$. The information input of register 84 is connected to input $80^{f}$ and the shift input to line 78.

FIG. 2.—OPERATION

When the control station of FIG. 1 transmits a complete data signal (i.e., a start signal followed by a group of information bits) these will be detected by receiver 42 of FIG. 1 and supplied, via line 60, to the units constituting processor 44. Matched filter 68 will recognize the start signal and actuate pulse generator 70. Pulse generator 70 will pulse delay line 72 and output lines $72^{a}$, et. seq., will be sequentially pulsed. A resultant train of sampling and synchronizing pulses will appear on lines 76 and 78.

Meanwhile the complete data signal has been applied to circuits 62 and 64 after delay in unit 66. Delay 66 should be selected so that the synchronizing pulses on line 76 will reach circuits 62 and 64 simultaneously with the information bits of the complete data signal. Delay 66 may be omitted if the start signal which precedes the data signal is long enough to provide the necessary delay to compensate for the processing time required by units 68, 60, 72, and 74.

Circuits 62 and 64 analyze the value and quality level of each information bit in the data signal and provide a series of appropriate value and quality level bits on lines $80^b$ and $80^a$, respectively, when instructed to by the synchronizing pulses on line 76.

Meanwhile the sampling and synchronizing pulses on line 78 cause the value and quality level information stored in registers 84 and 82 from a previous transmission to be read out and applied to lines $80^d$ and $80^c$, respectively, in synchronism with the incoming bits on lines $80^a$ and $80^b$. Circuit 80 processes the incoming information in accordance with the truth table of FIG. 6 and provides on output line $80^f$ a synthesized group of value bits which on a statistical basis, have more probability of being identical to the transmitted signal than the value bits actually received by the remote station. This synthesized signal is sent, via line 81, to transmitter 58 of FIG. 1 and retransmitted to the control station. The synthesized group of value bits and the concomitant synthesized group of quality level bits are also applied on lines $80^f$ and $80^e$ to registers 84 and 82 in synchronism with the pulses on line 78. The latter pulses shift the entire synthesized signals into the registers and then the circuit remains quiescent until the remote station either repeats the signal or transmits an execute signal.

The description and operation of individual circuits 62, 64, and 66 will now be discussed.

FIG. 3.—VALUE DECISION CIRCUIT

The value decision circuit 64 of FIG. 2, shown schematically in FIG. 3, determines if each input bit is greater or less than an arbitrarily defined level of symmetry which is assumed to be zero in the preferred embodiment. If the bit is greater, the circuit will provide a negative voltage indicating a MARK signal, and if the bit is less, the circuit will provide a ground indicating a SPACE signal. The output signals are made to appear in the form of pulses in response to the sampling pulses on lead 76.

The circuit is an emitter-coupled flip-flop which includes two transistors 102 and 104, the emitters of which are connected to positive source 106 via common resistor 108. The collector of transistor 102 is connected to the base of transistor 104 via a grounded voltage divider including resistors 110 and 112, with resistor 110 being paralleled by speedup capacitor 114. The collectors of transistors 102 and 104 are connected to negative source 116 via resistors 118 and 120, respectively. The collector of transistor 104 is also connected to one input of AND gate 120, the other input of which is connected to lead 76 from OR circuit 74 of FIG. 2.

The values of the resistors are adjusted so that the potential on the emitters is at ground, approximately, and the collector potential of transistor 104 is approximately at ground when transistor 104 is conducting.

When the input signal is positive (indicating a MARK), transistor 102 will be cut off and it will turn transistor 104 on in familiar fashion. When the input signal is negative (indicating a SPACE) transistor 102 will be turned on and it will cause transistor 104 to turn off. Thus the collector potential of transistor 104 will always assume one of two discrete values: ground for MARK signal inputs, and negative for SPACE signal inputs. The voltage level on the collector is sampled in AND gate 120 and fed to input $80^b$ of logic circuit 120.

FIG. 4.—QUALITY LEVEL DECISION CIRCUIT

The quality level decision circuit analyzes the incoming bits for absolute amplitude, i.e., if the absolute amplitude of each incoming bit is above a predetermined absolute threshold the circuit emits a negative voltage indicative of HI quality, and if the bit is below the threshold a ground voltage, indicative of LO quality, will be emitted. The output of the level decision circuit is made to appear in the form of pulses synchronized with the sampling pulses present on lead 76.

The circuit consists of two sections: (1) a detector, and (2) an emitter-coupled flip-flop identical to the circuit of FIG. 3.

The detector consists of a centertapped transformer 122, diodes 124–126, and a potentiometer 128. The incoming data signal from delay 66 is applied across the primary of transformer 122, one side of which is grounded. The ends of the secondary winding are connected to the cathodes of diodes 124 and 126, the anodes of the diodes being commonly connected to the base of transistor 102. The centertap on the secondary of transformer 120 is connected to the wiper of potentiometer 128, the respective and terminals of which are connected to positive source 130 and ground.

The commoned anodes of diodes 124 and 126 constitute the output terminal of the detector part of the circuit, said terminal being connected to the base of transistor 102, the input of the flip-flop and sampler part of the circuit.

When no input signal is applied the potential on the wiper of potentiometer 128 maintains both diodes back-biased since the anodes of the diodes are connected to the base of transistor 102 which is roughly floating slightly above ground potential due to the positive potential from source 106 coupled through resistor 108 and the emitter-base diode of transistor 102. When a positive or negative input pulse is applied to the primary of transformer 122, opposite-phased versions thereof will appear at the respective ends of the secondary winding with respect to the centertap thereof. If the incoming bit is of LO quality it will be insufficient to cause the potential on the more negative end of the secondary winding to overcome the wiper potential, and the diodes will remain back-biased. The potential at the base of transistor 102 will remain slightly positive, so that transistor 102 will remain nonconductive and transistor 104 conductive. The sampling pulse on lead 76 will cause the ground potential at the collector of transistor 104 to be supplied to input $80^a$ of logic circuit 80 of FIG. 2.

If the incoming bit is of HI quality it will cause the potential on the more negative end of the secondary to overcome the wiper potential, causing one of the diodes to be forward biased. A negative potential will be supplied to the base of transistor 102, turning transistor 102 on and turning transistor 104 off. The sampling pulse on lead 76 will cause the resultant negative potential at the collector of transistor 104 to be supplied in pulse form to input $80^a$ of logic circuit 80 of FIG. 2, thus indicating a quality of HI.

FIG. 5.—LOGIC CIRCUIT

Logic circuit 80 of FIG. 2 is shown in FIG. 5. As discussed, said circuit implements the truth table of FIG. 6. The circuit operates on negative logic, i.e., a negative voltage or binary ONE represents a value of MARK and a quality level of HI, while a ground voltage or binary ZERO represents a value of SPACE and a quality level of LO. The logic circuit has four inputs, $80^a$ to $80^d$, which respectively receive the signals already indicated. The two outputs of the logic circuit, $80^e$ and $80^f$, are connected to the quality level and value shift registers, respectively, and provide the resultant decisions indicated in the truth table. The logic circuit includes five inverters which are indicated by even numbers from 202 to 210; fourteen AND gates which are indicated by even numbers from 212 to 238; six OR gates which are indicated by numbers from 240 to 250, and a random binary signal source 252. The interconnections between these units may be easily understood by reference to the drawing and will not be detailed. Each AND gate will supply a binary ONE output only when both inputs are energized with ONE inputs. Each OR gate will supply a ONE output if any or all of its inputs receive ONE inputs. Each inverter will supply a ONE input when it "receives" a ZERO (no) input, and a ZERO (no) "output" when it receives a ONE input. Random binary signal source 252 will supply ONES and ZEROS at its output at random. Source 252 may be an astable multivibrator runing slightly slower than the bit frequency.

The operation of the logic circuit can best be understood by analyzing its operation for several arbitrarily chosen exemplary input conditions.

*Example I*

Input conditions:

| | |
|---|---|
| Stored value | MARK |
| Received value | SPACE |
| Stored level | LO |
| Received level | LO |

For these input conditions the truth table of FIG. 6 indicates (second column, third horizontal row down) that the resultant decision should be a RANDOM M or S value with a LO quality level, i.e., output lead $80^f$ should be energized with a random signal and lead $80^e$ should not be energized.

These input conditions will cause lead $80^d$ to be energized, with leads $80^b$, $80^c$, and $80^a$ not being energized. Both inputs of AND gates 214 and 226 will thus be energized, causing the output lead both AND gates to be energized. AND gates 212, 216, 218, 220, 222, and 224 will remain deenergized.

This will cause one input of OR gates 244 and 246 to be energized so that both will provide an output to energize both inputs of AND gate 234. AND gate 234 will provide an output to supply one input to AND gate 238, allowing the random binary signals from source 252 to appear at the lower input of OR gate 250 and hence output lead $80^f$.

Lead $80^e$ will remain deenergized since OR gates 240 and 242 do not provide outputs to energize both inputs of AND gate 232 which controls lead $80^e$.

EXAMPLE 2

Input conditions:

| | |
|---|---|
| Stored value | SPACE |
| Received value | MARK |
| Stored level | HI |
| Received level | LO |

For these input conditions the truth table of FIG. 6 indicates (fourth column, second row) that the resultant decision should be a SPACE with a LO quality level, i.e., output leads $80^f$ and $80^e$ should not be energized.

Under these conditions only input leads $80^b$ and $80^c$ will be energized, causing both inputs of AND gates 216 and 222 to be energized. OR gate 242 will provide an output, but this will energize only one input of AND gate 232 and line $80^e$ will not be energized. Neither the output of OR gate 248 nor the output of AND gate 234 will be energized; hence line $80^f$ will also remain unenergized.

Although many details of the invention have been discussed, it will be apparent to those skilled in the art that the invention is not restricted thereto and that various other forms of the specific system and components shown may readily be utilized without departing from its true scope. For instance in lieu of using bipolar pulses to indicate MARK and SPACE in the data signal, many other arrangements can be foreseen, such as bivalued unipolar pulses, unipolar pulses and ground, or different modulating tones. Suitable changes could easily be made in the circuits of FIGS. 4 and 5. In lieu of random binary signal source 252 could be used a fixed binary signal. Obviously various other forms of the circuits shown in FIGS. 3 to 5 may also be used. In lieu of gate 52 and matched filter 48 other suitable means of effecting use of the correct stored signal will occur to those skilled in the art. Accordingly the limits of the invention are indicated only by the appended claims.

I claim:

1. In an error-free data transmission link of the type wherein a signal comprised of a plurality of bits is repeatedly transmitted to and stored at a remote station, a system in said remote station for decreasing the number of transmissions necessary to store said signal correctly comprising:

(a) means for determining the value and quality level of the individual bits of each presently-received signal, and (b) means for comparing the value and quality level of the individual bits of each received signal with the value and quality level of the corresponding individual bits of a previously-stored signal synthesized in response to the next-preceding received signal.

2. In an error-free data transmission link of the type wherein a signal comprised of a plurality of bits is cyclically transmitted from a control station to and stored at a remote station, a system for synthesizing in response to each received signal a stored signal having a statistical probability of being more accurate than said received signal, said system comprising:

(a) means for determining the value and absolute signal level of each of the bits of each received signal, (b) means for comparing said value and absolute signal level with the value and absolute signal level of the bits of the preceding stored signal, and (c) means responsive to said comparing means for synthesizing a further signal composed of bits determined by said comparison of values and absolute signal levels.

3. In a system for transmitting a signal comprising a plurality of binary bits from a control station to a remote station without error by cyclically: transmitting said signal to said remote station, storing in said remote station the signal received, and retransmitting the stored signal to said control station for comparison with the signal transmitted until the stored signal is identical to the signal transmitted; an improvement in said remote station for decreasing the number of cycles required before said stored signal is identical to said transmitted signal when adverse signal-to-noise conditions are present, comprising:

(a) means for assigning a quality level indication of low or high to each bit in each received signal dependent on the relative absolute amplitude of each bit with reference to a predetermined absolute threshold level; and (b) means for generating a synthesized stored signal in response to each received signal wherein each bit of the synthesized stored signal is assigned a value and quality level determined by the value and quality level of the currently received signal and value and quality level of the next previously stored signal.

4. In an error-free data transmission link of the type wherein a signal comprised of a plurality of bits is repeatedly transmitted to and stored at a remote station until it is determined that said signal is stored correctly, a system in said remote station for decreasing the number of transmissions necessary to store said signal correctly when adverse signal-to-noise conditions prevail, comprising:

(a) means for determining the value and quality level of the individual bits of each presently-received signal, and (b) means for (1) comparing the value and quality level of the individual bits of each received signal with the value and quality level of the corresponding individual bits of a previously-stored signal synthesized in response to the next-preceding received signal, and (2) for synthesizing a new stored signal on a bit-by-bit basis wherein the value of each bit thereof is:

(1) identical to whichever of the corresponding bits of the previously-stored and presently-received signals has the higher quality level, if the values of said corresponding bits are different, (2) the same as the value of said corresponding bits if said corresponding bits have identical values, and (3) arbitrary if said corresponding bits have different values but identical quality levels; and wherein (1) a relatively high quality level is assigned to each bit of said new stored signal if the values of each corresponding bits are identical, and (2) a relatively low quality level is assigned if otherwise.

5. The invention of claim 1 wherein:

(a) a control station is provided for transmitting said signal to said remote station, (b) said remote station includes means for retransmitting a signal identical to each new synthesized stored signal to said control station, and (c) said control station further includes means for receiving the signal retransmitted by said remote station and comparing it with the signal originally transmitted.

6. In an error-free data transmission link of the type wherein a signal comprised of a plurality of bits is cyclically transmitted from a control station to and stored at a remote station, each stored signal also being retransmitted from said remote station to said control station for comparison with each transmitted signal until it is determined that said stored signal is identical to the transmitted signal, a system in said remote station for decreasing the number of cycles necessary to store said signal correctly when adverse signal-to-noise conditions are present, comprising:

(a) means, responsive to each presently-received signal and a previously-synthesized signal generated by this means in response to each next preceding received signal, for generating a new synthesized signal, said new signal having the same number of bits as each presently-received signal, each bit having:

(1) a value identical to whichever of the correspondingly numbered bits of the presently-received and previously synthesized signals has a higher quality level if said correspondingly-numbered bits have different values, or a value identical to said correspondingly-numbered bits if both have the same value, or an arbitrary value if said correspondingly-numbered bits have different values but the same quality level, and (2) an assigned quality level which is relatively high if said correspondingly-numbered bits have the same value and relatively low if otherwise; and (b) means for retransmitting each new synthesized signal generated in response to each presently-received signal to said control station for comparison with each transmitted signal.

7. In a system for transmitting a signal comprising a plurality of binary bits from a control station to a remote station without error by cyclically: transmitting said signal to said remote station, storing in said remote station the signal received, and retransmitting the stored signal to said control station for comparison with the signal transmitted until the stored signal is identical to the signal transmitted; an improvement in said remote station for decreasing the number of cycles required before said stored signal is identical to said transmitted signal when adverse signal-to-noise conditions are present, comprising:

(a) means for assigning a quality level indication of low or high to each bit in each received signal dependent on the relative absolute amplitude of each bit with reference to a predetermined absolute threshold level; and (b) means for generating a synthesized stored signal in response to each received signal wherein each bit of the synthesized stored signal is assigned:

(1) a value identical to whichever of the two correspondingly-numbered bits in the received signal and next-preceding synthesized signals, respectively, has the higher value if one of said corerspondingly-numbered bits has a higher quality level than the other; a value identical to said correspondingly-numbered bits if both have the same value; and an arbitrary value if said correspondingly-numbered bits both have the same quality level but different values; and (2) a quality level of high if said correspondingly-numbered bits have the same value and a quality level of low if otherwise.

8. In combination:

(a) a source of sequential first signals, each first signal comprised of a fixed number of binary bits, each bit having a preassigned value of MARK or SPACE and a quality level of LO or HI if its absolute amplitude is respectively above or below a predetermined absolute threshold level, (b) means, responsive to each of said first signals, for comparing the individual bits of each of said first signals with the individual bits of a stored second signal previously synthesized by this means in response to a previous first signal, and for synthesizing, as a result said comparison, a new second signal, each of the synthesized second signals having said fixed number of bits, each bit having the same possible values and quality levels as the bits of said first signal, each bit being assigned:

(1) a value the same as the values of the corresponding bits of said stored second signal and said first signal and a quality of HI if the values of the corresponding bits of said stored second signal and said first signal are identical, (2) a quality of LO and a value the same as whichever of the corresponding bits of said stored second signal and said first signal is assigned a HI quality of the values and qualities of the corresponding bits of said stored second signal and said first signal are different, and (3) a quality of LO and an arbitrary value if the values of the corresponding bits of said stored second signal and said first signal are different but their quality levels are the same.

9. The combination of claim 8 wherein said means includes a logic circuit arranged to receive said first signals and said stored signals and signal storage means connected to the output of said logic circuit for receiving said new stored signals, and arranged to supply said stored second signals to said logic circuit.

10. The combination of claim 9 wherein said source of first signals is also arranged to supply a start signal before each of said first signals and said means is also arranged to recognize said start signal for providing, in response thereto, a group of synchronizing pulses for synchronizing operation of said signal storage means, the period and number of said synchronizing signals being equal to the period and number of the bits in said first signals.

11. A remote station arranged for error-free reception of signals sequentially transmitted by a control station, each signal comprising a fixed number of binary bits, said station comprising:

(a) a receiver arranged to receive and demodulate the signals transmitted by said control station, (b) a value decision circuit connected to said receiver and arranged to determine the value of each binary bit in each received signal by providing a binary ONE for bits of a first value and a binary ZERO for bits of a second value, (c) a quality level decision circuit also connected to said receiver and arranged to determine the received quality level of each received bit in each binary signal by providing a binary ONE for received bits having a received quality above a predetermined value and a binary ZERO for received bits having a quality below said predetermined value, (d) a logic circuit having four inputs, designated *a* to *d*, and two outputs, designated *e* and *f*, said logic circuit arranged to:

(1) provide on output *f* a bit identical to the bits supplied to inputs *b* and *d* if the bits supplied to inputs *b* and *d* are identical, (2) provide on output *f* a randomly selected bit if the bits supplied to inputs *b* and *d* are not alike and the bits supplied to inbuts *a* and *c* are alike.

(3) provide on output *f* a binary ONE if the bits supplied to inputs *b* and *d* are alike and at least one of the bits supplied to inputs *a* and *c* is a binary ONE, and provide a binary ZERO on output *f* if otherwise, (e) a quality level shift register having an information input and output, (f) a value shift register having an information input and output, (g) means connecting outputs *e* and *f* of said logic circuit to the respective inputs of said quality level and value shift registers, and inputs *c* and *d* of said logic circuit to the respective output of said quality level and value decision circuits, and (h) means responsive to the reception of a signal by said remote station for synchronizing operation of the units in said station and synchronously shifting both of said registers.

References Cited

UNITED STATES PATENTS

| | | | |
|---|---|---|---|
| 3,114,884 | 12/1963 | Jakowatz | 328—135 X |
| 3,248,695 | 4/1966 | Dascotte | 340—146.1 |

JOHN W. CALDWELL, *Acting Primary Examiner.*

DAVID G. REDINBAUGH, *Examiner.*

J. T. STRATMAN, *Assistant Examiner.*

UNITED STATES PATENT OFFICE
CERTIFICATE OF CORRECTION

Patent No. 3,344,353 September 26, 1967

Jack E Wilcox

It is hereby certified that error appears in the above numbered patent requiring correction and that the said Letters Patent should read as corrected below.

In the heading to the drawings, Sheets 1 to 3, line 1, for "J. E. WILCOX", each occurrence, read -- J. E WILCOX --; in the heading to the printed specification, line 4, for "Jack E. Wilcox" read -- Jack E Wilcox --.

Signed and sealed this 11th day of February 1969.

(SEAL)
Attest:

Edward M. Fletcher, Jr.
Attesting Officer

EDWARD J. BRENNER
Commissioner of Patents